US008619625B2

United States Patent
Käfer et al.

(10) Patent No.: US 8,619,625 B2
(45) Date of Patent: Dec. 31, 2013

(54) NETWORK AND METHOD FOR THE COMPUTER-ASSISTED OPERATION OF AN AUTONOMOUS NETWORK COMPRISING A PLURALITY OF AUTONOMOUS TERMINALS

(75) Inventors: Gerald Käfer, München (DE); Eiman Bushra Mohyeldin, München (DE); Christoph Niedermeier, München (DE); Reiner Schmid, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 811 days.

(21) Appl. No.: 12/225,531

(22) PCT Filed: Mar. 20, 2007

(86) PCT No.: PCT/EP2007/052602
§ 371 (c)(1),
(2), (4) Date: Feb. 24, 2009

(87) PCT Pub. No.: WO2007/110348
PCT Pub. Date: Oct. 4, 2007

(65) Prior Publication Data
US 2009/0225678 A1   Sep. 10, 2009

(30) Foreign Application Priority Data

Mar. 24, 2006 (DE) .......................... 10 2006 013 769

(51) Int. Cl.
*H04J 3/17* (2006.01)
*H04W 4/00* (2009.01)
*G06F 15/173* (2006.01)

(52) U.S. Cl.
USPC ............ 370/254; 370/338; 370/433; 709/223

(58) Field of Classification Search
USPC ................. 370/229–241, 252–254, 329–352; 709/220–226
See application file for complete search history.

(56) References Cited

U.S. PATENT DOCUMENTS 6,067,545 A * 5/2000 Wolff .................................... 1/1
7,450,947 B2 * 11/2008 Kuffner et al. ................ 455/447
(Continued)

FOREIGN PATENT DOCUMENTS

| EP | 0 621 707 | 10/1994 |
|---|---|---|
| WO | 03/061224 | 7/2003 |
| WO | 2004/112325 | 12/2004 |

OTHER PUBLICATIONS

L. Berlemann et al., "Policy-based Reasoning for Spectrum Sharing in Cognitive Radio Networks" IEEE, 2005; pp. 1-10; Figs. 1-2; p. 2, left-hand column, line 6; p. 4, left-hand column, line 2.

*Primary Examiner* — Man Phan
(74) *Attorney, Agent, or Firm* — Staas & Halsey LLP

(57) ABSTRACT

An autonomous network has a plurality of autonomous terminals, equipped with at least one programmable transceiver, and which are embodied to independently identify frequency ranges provided for a communication link and used to reconfigure the programmable transceiver thereof. One or more technical system states of the network, with which a specific operation of the network is described, is defined. One or more sets of rules are defined for the autonomous terminal, one rule comprising authorized operational states and/or configurations of the autonomous terminals. The effects of the actual operation state and/or configurations of the autonomous terminals on the actual system state of the network is monitored. The sets of rules and/or definition of new rules, which comprise actual operational states or configurations of the autonomous terminals, is adapted when the actual system state of the network differs from the defined system state of the network.

24 Claims, 2 Drawing Sheets

(56) References Cited

U.S. PATENT DOCUMENTS

| | | |
|---|---|---|
| 7,451,201 B2 * | 11/2008 | Alex et al. .................... 709/223 |
| 7,787,426 B2 * | 8/2010 | Seidel et al. .................. 370/338 |
| 7,793,333 B2 * | 9/2010 | Goh et al. ........................ 726/1 |
| 2005/0091352 A1 | 4/2005 | Alex et al. |
| 2006/0023741 A1 * | 2/2006 | Charzinski et al. ........... 370/465 |
| 2006/0148482 A1 * | 7/2006 | Mangold ....................... 455/450 |
| 2008/0112427 A1 * | 5/2008 | Seidel et al. .................. 370/433 |

\* cited by examiner

NETWORK AND METHOD FOR THE COMPUTER-ASSISTED OPERATION OF AN AUTONOMOUS NETWORK COMPRISING A PLURALITY OF AUTONOMOUS TERMINALS

CROSS REFERENCE TO RELATED APPLICATIONS

This application is based on and hereby claims priority to German Application No. 10 2006 013 769.8 filed on Mar. 24, 2006 and PCT Application No. PCT/EP2007/052602 filed on Mar. 2, 2007, the contents of which are hereby incorporated by reference.

BACKGROUND OF THE INVENTION

The invention relates to a method for the computer-assisted operation of an autonomous network comprising a plurality of autonomous terminals.

The invention also relates to a network comprising a plurality of autonomous terminals.

If "transceiver" (artificial word composed of transmitter and receiver) is mentioned, this is understood to be the designation of a combination of a transmitter and a receiver constructed in a structural unit. The transceiver is responsible for transmitting and receiving signals via a transmission medium and particularly for feeding the signals into and coupling them out of the medium.

The terminal is object, e.g. a computer, mobile computer, telephone or mobile telephone which is connected to a network termination of a network e.g. a data or telecommunication network. The connection can be of a direct type, that is to say line-connected, or of an indirect type via a radio link.

The development of wireless networks is characterized by an increased flexibility in the utilization of the frequency band. This is associated with a development of terminals which can utilize the radio technologies and frequency bands largely autonomously within the framework of the given regulations. An example of such terminals which have a largely autonomous operation with a change between radio technologies and frequency bands are so-called "cognitive radios" which are based on the use or reconfigurable terminals (so-called SDR terminals).

In the previously known mobile radio networks, the processes and criteria for utilizing a radio technology and the change between various radio technologies are defined by standards. Control is effected by a so-called radio resource management. In the UMTS (Universal Mobile Telecommunication System) standard, for example, this is handled by a central unit which is called RNC (radio network controller). According to this standard, mobile terminals are controlled by the network itself.

It can be expected that networks of future generations will no longer have this central management. Thus, methods for resource administration and control in automated networks are needed.

In US 2005/0091352 A1 a method for a rule-based autonomous computer system is described which derives certain actions by observing the state of resources of the computer system. The actions are used for bringing the computer system into a defined final state when the current actual state of the computer system deviates from a desired state.

SUMMARY

It is one potential object to specify a network and a method for the computer-assisted operation of a network which allows the autonomous operation of terminals.

The inventors propose that the dynamics of autonomous terminals can lead to collective effects. Such dynamics are given, for example, in the decision and performance of mood changes. As a result, such dynamics can considerably impair the operation, particularly of cellular radio networks. Thus, e.g., cellular networks can lead to disturbances in the operation of the network by the simultaneous change of a relatively large number of terminals to a particular base station of the network. The inventors therefore propose the concept of imposing a restriction on the behavior of the terminals on such dynamics. Since static restrictions are not considered to be adequate, a dynamic restriction of the behavior of the terminals which is adapted to the respective situation is proposed. In this context, the network is continuously observed so that when unwanted states occur, suitable counter measures can be derived and imposed on the terminals.

Accordingly, the method proposed by the inventors for the computer-assisted operation of a network comprising a plurality of autonomous terminals which have at least one programmable transceiver and which are arranged for independently identifying, and utilizing by reconfiguring their programmable transceiver, frequency ranges available for a communication link, comprises the following steps

- defining one or more technical system states of the network, by which a certain operation of the network is described;
- defining one or more sets of rules of the autonomous terminals, a rule comprising authorized operating states and/or configurations of the autonomous terminals;
- monitoring the effects of the actual operating states and/or configurations of the autonomous terminals on the actual system state of the network;
- adapting the sets of rules and/or defining new rules which comprise authorized operating states or configurations of the autonomous terminals when the actual system state of the network deviates from the defined system state(s) of the network.

If, a set of rules is mentioned, the set can have a single rule or a plurality of rules.

The proposed method ensures that terminals acting autonomously within the network utilize resources of the network in such a manner that defined aims of an operator of the network which relate to the operation of the network are achievable. Such aims which are found again in the system states can be, e.g. the capacity utilization of the network, an interference-free operation in decided frequency bands, the reservation of parts of certain frequency bands for particular types of utilizations such as, for example, emergencies or the like.

Thus, the individual terminals are not controlled centrally by the specification of certain rules but, instead, by the specification of a set of rules which influence the behavior of the autonomous terminals. By continuously analyzing the effects of the collective behavior of the autonomous terminals and the possibility of adapting the rules, differences from the aims or the system states, respectively, which may be found, can be counteracted.

In the context of this document, the autonomous terminals are understood to be, in particular, the "cognitive radios" already mentioned initially which independently identify, and can utilize by reconfiguring their programmable transceiver, available frequency ranges suitable for their current context of utilization.

Correspondingly, the proposed network is also called "cognitive radio network" since it is capable of learning from an observation and making decisions with regard to the modification of the rules by which the behavior of the autonomous terminals is influenced.

One feature of the method thus relates to the fact that the network does not intervene directly in the operation of individual terminals in that certain commands or instructions are transmitted to the relevant terminals. Instead, interventions are indirect via (behavioral) rules.

According to one embodiment of the method, the transmission of at least one set of rules to the autonomous terminals is provided as a further step. In this context, the rules can be transmitted actively by the network but this can also occur passively, e.g. by a downloading initiated by the terminals.

In a further embodiment, the autonomous terminals assume a target operating state and/or a target configuration which is derived from a context of utilization and utilization preferences, the target operating state and/or the target configuration fulfilling the sets of rules. Preferences of utilization can be, for example, the preferred utilization of a particular frequency band, a desired bandwidth or a particular quality of service. The context of utilization is determined, for example, by tasks of the terminal to be completed. In other words, the primary operation of the autonomous terminals is defined by the context of utilization specific to the terminal and any specified preferences of utilization. This results in a target operating state and/or a target configuration which, due to the rules still to be taken into consideration by the terminals should lie within these rules.

A continuous adaptation of the rules as a response to particular system states of the network is obtained if the autonomous terminals are caused by the set of rules to report the network resources utilized by them to the network. The data transferred to the network during this process comprise, for example, the frequency range used, CDMA codes or interferences generated by the selected transmission power. These are only some examples, the enumeration having to be considered as non-conclusive. In particular it is provided that the network resources utilized by the autonomous terminals are continuously transferred to the network.

It is also provided that the data transferred by the autonomous terminals and relating to the network resources utilized are linked by an analysis unit in the network with one or more network characteristics which are determined by network monitoring units of the network, in order to determine whether the actual system state of the network deviates from the defined global system state(s) of the network. In this context, it is provided, in particular, that the network characteristic or network characteristics are monitored continuously. Comparing an actual system state with previously defined system states of the network enables the sets of rules to be continuously adapted and/or new rules to be defined in order to be able to achieve the defined system states of the network in the best possible manner. This makes it possible to create a type of control loop as a result of which, in the ideal case, the actual system state of the network can be mapped onto the defined system state of the network.

According to a further embodiment, it can be provided that for different sections of the network, different sets of rules are provided which take into consideration the peculiarities of the network structure and/or the utilization by autonomous terminals. Autonomous terminals which change from one of the sections of the network to one of the other sections of the network can then be assigned a new set of rules. This makes it possible to achieve an optimized operation of the network since specific characteristics of the network can be taken into consideration in the different sections. For each section of the network, at least one network node with network-rule-providing functionality can be provided which keeps available the sets of rules necessary for the relevant section.

According to a further embodiment, it can be provided that in the case of a plurality of networks administered separately from one another, which utilize common network resources, the technical system states of the network by which a particular operation of the network is described are exchanged. This facilitates the cooperation of a plurality of operators who are active in a certain region, in as much as this is required for the administration of jointly utilized resources.

A set of rules used in the context of the proposed method can comprise rules of a first type and rules of a second type. In this context, the rules of the first type comprise economic boundary conditions and the rules of the second type comprise technical boundary conditions of the network. The rules of the first type can specify, for example, costs and business conditions for the utilization of particular services. The rules of the first type thus correspond to a business model selected by the operator. In particular, the rules of the first type also define the costs and business conditions of the utilization of services and resources at other network operators if there is roaming between networks administered by different operators. The rules of the first type can be generated externally by an operator of the network. As a rule, the rules of the first type remain constant over a relatively long period.

The rules of the second type are generated by a rule generating unit in the network and are adapted periodically or at irregular intervals in accordance with the method previously described and are provided to the terminals located within the communication area of the network. A characteristic of the rules of the second type takes into consideration in the utilization of the resources of the network by the terminals. It can be provided that autonomous terminals which do not adhere to the framework of operating states and/or of the configuration set by the rules are excluded from the utilization of the resources of the network.

In a further embodiment, the sets of rules are provided by the network, particularly a network node with network-rule-providing functionality. In a further embodiment, the sets of rules are generated and/or adapted by the network.

A network comprising a plurality of autonomous terminals which have at least one programmable transceiver and which are arranged for independently identifying, and utilizing by reconfiguring their programmable transceiver, frequency ranges available for a communication link comprises the following features:

for the network, one or more technical system states are defined by which a certain operation of the network is described;

the autonomous terminals are assigned one or more sets of rules, a rule comprising authorized operating states and/or configurations for the autonomous terminals;

at least one analysis unit is provided for monitoring the effects of the actual operating states and/or configurations of the autonomous terminals on the actual system state of the network;

at least one rule generating unit is provided for adapting the sets of rules and/or defining new rules when the actual system state of the network deviates from the defined system state(s) of the network.

The network is arranged for carrying out the proposed method described above. In this context, it is ensured that efficient administration of network resources is possible even with an increasing configurability of network elements and terminals and the associated increasing complexity of the overall arrangement. In particular, it must be emphasized that a central unit for controlling the most varied network elements is not necessary.

Depending on the capabilities of the terminals, these have a relatively large number of possibilities of freely utilizing the resources of the network as a result of which an application optimized for the users of the terminals is possible.

Predefined rules are considered as guidelines for the behavior of the terminals within the network. In spite of higher degrees of freedom for the operation of the terminals, the rules ensure that the interests of the operators of the network and of the remaining users of the network infrastructure are protected.

A further advantage relates to the possibility of self-configuration. Both the terminals and the networks interacting with them largely configure themselves and in this process optimize the utilization of their resources as specified by predetermined conditions which are formulated in the rules. The rules predetermined by the networks enable the network to influence individual terminals without having to know their detailed behavior of utilization or even their inner states.

Advantageously this is associated with a self-optimization since, due to the automatic adaptation of rules, it becomes possible to optimize the behavior of the overall system including a multiplicity of terminals and the network or networks without having to know the detailed operation of individual terminals.

In one embodiment, the network comprises at least one network monitoring unit which is arranged for monitoring and/or determining one or more network characteristics.

In a further embodiment, the network can have at least one terminal monitoring unit which is arranged for receiving data which are transmitted by the autonomous terminals and comprise network resources utilized by them.

The analysis unit of the network is suitably arranged for linking the data provided by the at least one network monitoring unit and the at least one terminal monitoring unit in order to determine whether the actual system state of the network deviates from the defined global system state(s) of the network. The analysis unit thus represents an important component of the "control loop" for the continuous adaptation of rules and thus for influencing the system state of the network. The data determined and provided by the analysis unit can be processed by a rule generating unit as input data for generating altered and/or new sets of rules.

The inventors also propose an autonomous terminal which has at least one programmable transceiver and is arranged for independently identifying, and utilizing by reconfiguring its programmable transceiver, frequency ranges available for a communication link. The autonomous terminal is also arranged for processing a set of rules provided by a network, a rule comprising authorized operating states and/or configurations of the autonomous terminals. It is also arranged for assuming a target operating state and/or a target configuration which is/are derived from a context of utilization and utilization preferences, the target operating state and/or the target configuration fulfilling the sets of rules.

Furthermore, the autonomous terminal is arranged for updating the set of rules at specified intervals. In other words, this means that the terminal is capable of checking whether the present set of rules is still valid or not. In the case of a found invalidity, the terminal is arranged for calling up a new set of rules. The calling-up can occur actively or passively in that the terminal actively downloads available new sets of rules or initiates a transmission of one or more sets of rules by the network.

The inventors also propose a computer program which can be loaded directly into the internal memory of a digital computer and comprises software code sections by which the steps of the method described are executed when the product is running on a computer.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
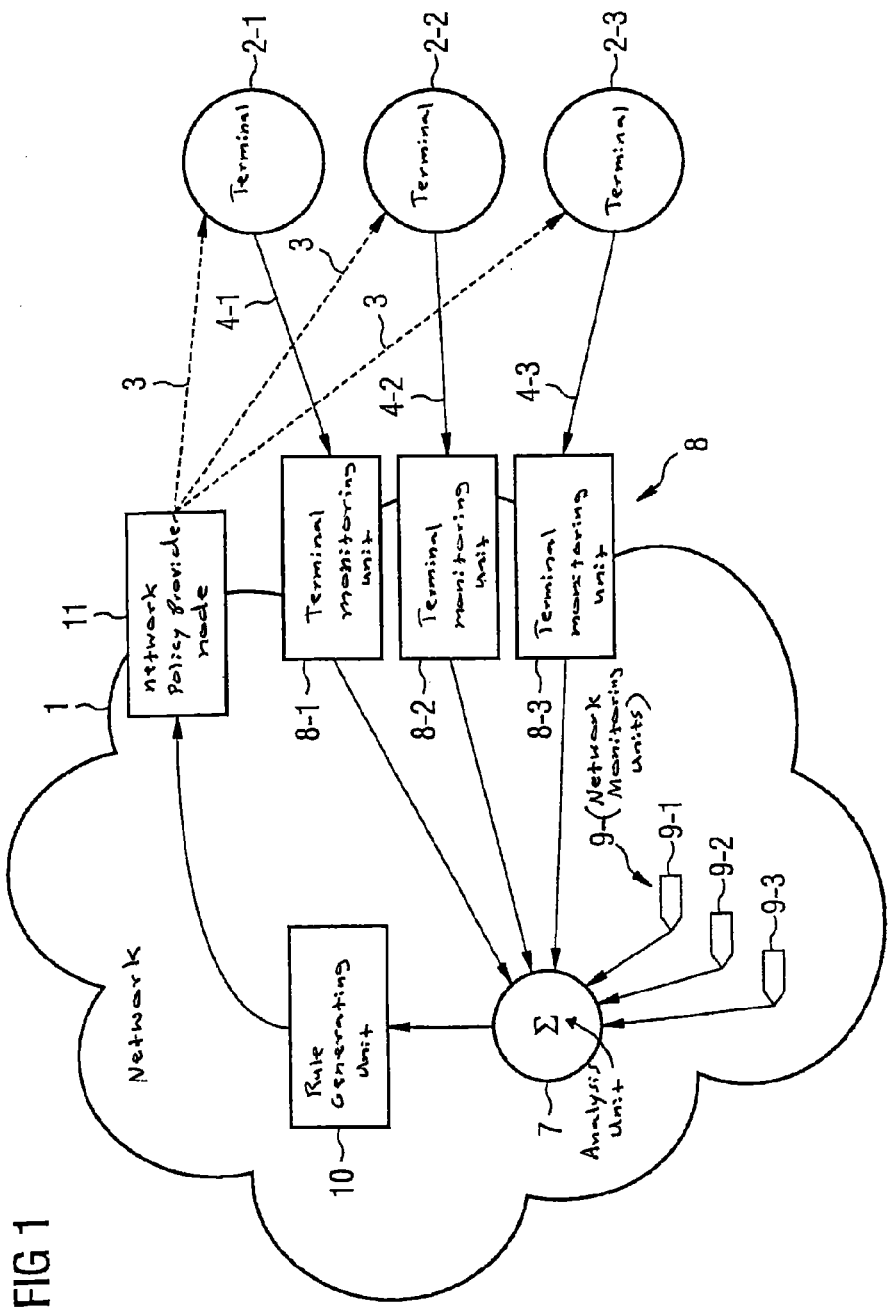
FIG. 1 shows the diagrammatic configuration of a proposed network.

Reference will now be made in detail to the preferred embodiments of the present invention, examples of which are illustrated in the accompanying drawings, wherein like reference numerals refer to like elements throughout.

FIG. 1 shows an exemplary, diagrammatic configuration of a proposed network 1 (cognitive radio network) which, for example, supplies three autonomous terminals 2-1, 2-2 and 2-3 (cognitive radios) with a set of rules which regulate the behavior of the terminals 2-1, 2-2 and 2-3 with respect to the allocation of resources which are provided and administered by the network 1.

The rules specify, e.g., conditions which must be met by a terminal when changing a network to another network. For example, such a planned change must be signaled a time interval previously specified. The rules can be present in any format. Examples of this are the XML (extendable markup language) format or an object-oriented syntax.

The rules are provided by a network node 11 with rule-providing functionality ("network policy provider") for the terminals 2-1, 2-2 and 2-3. The provision is symbolized in FIG. 1 by the dashed lines identified by the reference symbol 3. The rules can be offered by the network node 11 via suitable protocols for independent downloading by the terminals 2-1, 2-2, 2-3. It is also conceivable that the network node 11 transfers the rules actively by itself to the terminals 2-1, 2-2, 2-3.

In the context of these rules, the terminals 2-1, 2-2, 2-3 in each case determine themselves how they achieve their targets derived from a current context of utilization and possibly preferences of the user of the terminal. Targets can be, e.g. a downloading volume not to be exceeded, a particular bandwidth, a particular quality of transmission, a required achievability or costs.

Each of the terminals 2-1, 2-2, 2-3 is obliged by the rules to report the network resources utilized by it to the network 1 via a terminal monitoring unit 8. For this purpose, each of the terminals 2-1, 2-2, 2-3 transmits one (or more) respective messages 4-1, 4-2, 4-3 to the terminal monitoring unit 8. In the exemplary embodiment of FIG. 1, only one number, corresponding to the number of terminals, of terminal monitoring units 8-1, 8-2, 8-3 ("resource usage interface") is provided in this context. This is only selected for illustrative purposes. It is sufficient if, for example, only one terminal monitoring unit 8 is provided in the network 1. However, a larger number of terminal monitoring units can also be provided.

Network resources utilized and to be reported to the network 1 can be, for example, a certain frequency range, certain CDMA codes or interferences generated by the selected transmission power. This enumeration is to be considered only by way of example and as non-conclusive.

An analysis unit 7 of the network 1 is coupled to the terminal monitoring unit 8 and processes the information transmitted by the terminals 2-1, 2-2, 2-3 with data relating to one or more network characteristics. The network characteristics are determined by a network monitoring unit 9. For example, FIG. 1 shows three network monitoring units 9-1, 9-2, 9-3. The number is only selected by way of example and can be selected arbitrarily in practice. The network characteristic or characteristics are preferably monitored continuously by the network monitoring unit.

From the data supplied to it, the analysis unit 7 is able to determine and to analyze the actual system state of the network 1. In this context, it is determined whether a specified technical system state, by which an operation of the network is described, is achieved. In other words, it is checked whether targets predetermined by an operator of the network 1 are reached in reality. If this is not the case, a rule generating unit 10 coupled to the analysis unit 7 generates a new set of rules in such a manner that the expected behavior of the terminals which follow these altered or new rules agrees better with the specifications. The term of the new set of rules must be understood in such a manner that both new rules can be generated and existing rules can be modified.

This process, including the transmission of the new and/or altered rules via the network node 11 to the terminals 2-1, 2-2, 2-3 affected is periodically repeated. This forms a type of "control loop", but it is not individual parameters of individual terminals which are adapted but, instead, a set of rules binding to all terminals.

The context of this procedure also comprises that, in the generation of new and/or altered rules, these are only transmitted for further application to a part of the terminals connected to the network. In this context, the adaptation of the rules to the current situations of the network and a system state to be achieved does not necessarily have to be global for the entire infrastructure of the network. Instead, an adaptation can also be performed locally in order to take into account local peculiarities both of the structure of the network and of the utilization by the terminals.

Terminals which move from one section of the network into another section may be in some circumstances equipped with a new set of rules in this context. The adaptation and distribution of these locally valid "rules" can be carried out, e.g. by local network nodes with rule-providing-functionality, these being responsible in each case for a limited section of the network. Similarly, terminal monitoring units and/or network monitoring units allocated to the local sections can be provided. These receive information about the utilization of resources only from those terminals which are located in their coverage area. Correspondingly, only network characteristics of the section of responsibility are monitored.

As a result, an autonomous, decentralized resource management of the network is effected since no central component is provided for coordinating the interaction of the individual network components.

Since in some circumstances several operators of different networks may be active in a particular area, who cooperate with one another by jointly utilizing certain network resources e.g. one frequency spectrum, the exchange of information between the networks of the different operators can also be provided in as much as this is required or appropriate for the administration of jointly utilized resources.

Figure 2:
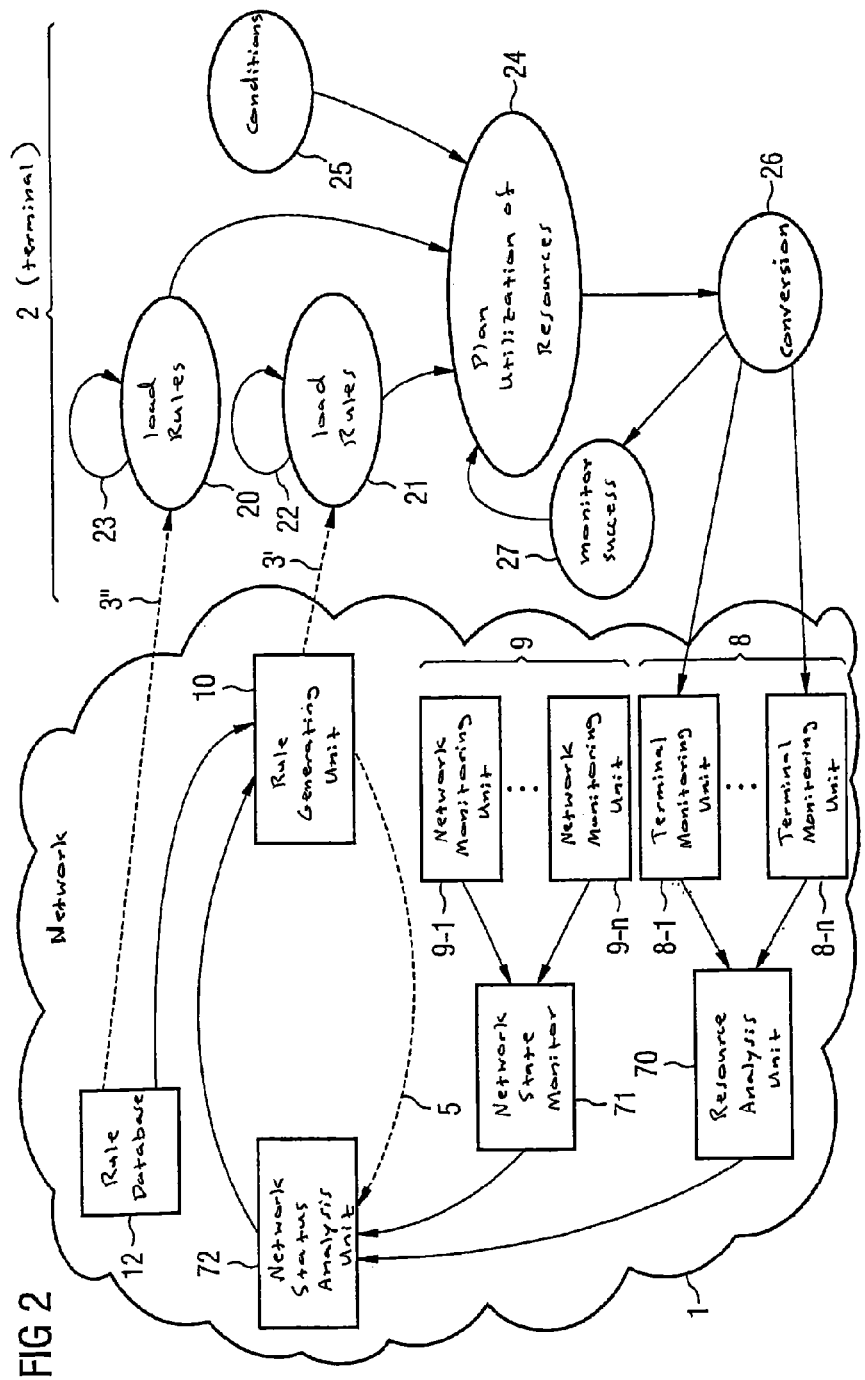
FIG. 2 shows a possible exemplary embodiment of the interaction of the network with an autonomous terminal.

FIG. 2 shows a possible embodiment of the interaction of the network 1 (cognitive radio network) and of an autonomous terminal 2 (cognitive radio). The figure shows that network 1 does not exert direct control over the terminal 2 but only provides information for the current utilization of the network and guidelines in the form of rules for a possible utilization by the terminal. The decision of how the terminal 2 utilizes the resources provided by the network 1 is made by the terminal 2 itself.

The network provides rules of a first type and rules of a second type. This is indicated by the dashed lines characterized with the reference symbol 3' and 3".

Rules of the first type are stored in a rule database 12 and are designated as "business policies". These rules specify e.g., costs and business conditions of the utilization of various services offered by the network 1. In particular, the rules contained in the rule database 12 contain costs and business conditions of the utilization of services and resources at other network operators, e.g. in the case of roaming. The rules of the first type are generated externally by the operator of network 1 and, as a rule, remain unchanged over a relatively long period.

The rules of the second type are generated by the rule generating unit 10 (network policy generator) already described in FIG. 1 and may be periodically adapted as described in conjunction with FIG. 1 and transmitted to the terminals or provided for retrieval via a network node (not drawn in FIG. 2). Adhering to these rules of the second type in the utilization of the resources of network 1 is mandatory for the terminals. Otherwise, they may be excluded from utilization of the resources of network 1. A relevant check is possible via the terminal monitoring unit 8 by the data transmitted by the terminals and containing the resources utilized.

In the right-hand half of FIG. 2, it is indicated how the rules of the first and second type enter into the framework of internal decision processes in the terminal 2. The terminal 2 plans the utilization of network resources taking into consideration the present rules of the first and second type. In the exemplary embodiment, it is assumed that terminal 2 independently loads the rules of the first and second type by downloading from the network 1. This is indicated by the steps marked with reference symbols 20 and 21 (fetch business policies). In this process, rules of the first and second type which may be altered are retrieved periodically (reference symbol 22, 23). The planning of the utilization of the resources of the terminal is marked by the reference symbol 24 (planning for solving tasks considering the received policies), taking into consideration, apart from the rules of the first and second type, further boundary conditions (reference symbol 25, "receive tasks"). The conversion takes place in step 26 ("executive plans"). In the execution, that is to say the utilization of the resources needed in network 1, the resources utilized by terminal 2 are transferred, as described above, to the terminal monitoring unit 8 of network 1 ("report resource usage"). In parallel, the success in achieving the targets set by the terminal can be optionally monitored in step 27 (monitor success), where the result of the monitoring and analysis can again be taken into consideration in the planning of the tasks to be carried out, in step 24.

In network 1, the data supplied by the network monitoring unit 9 are processed in a network state monitor 71 to form one or more network characteristics. The data supplied by the terminal monitoring unit 8 (resource usage interface) are accumulated with regard to the utilization of the resources provided by the network 1 in a resource analysis unit 70 (resource usage analyzer). The data processed by the resource analysis unit 70 and the network state monitoring unit 71 are transferred to a network status analysis unit 72 which compares utilization statistics and/or network characteristics with predetermined data and, if necessary, causes the rule generating unit 10 to adapt existing rules or to generate new rules, respectively.

The resource analysis unit 70, the network monitoring unit 71 and the network status analysis unit 72 together form the analysis unit provided with reference symbol 7 in FIG. 1.

In the proposed method it is assumed that the rules, particularly the rules of the second type, are formulated in each case in such a manner that it is possible to roughly estimate the consequences of the adaptation of certain parameter values with regard to their influence on the collective behavior of the terminals.

The rule generating unit 10 comprises a rule-based decision unit and a self-learning component which generates variants for the network status analysis unit 72 (compare the dashed arrow marked by the reference symbol 5). The network 1 is thus able to "try out" various strategies in the generation or adaptation of the rules and this incrementally approaches an optimum. The methods used in this process can be found in control technology and artificial intelligence.

In the exemplary embodiment of FIG. 2, the terminal monitoring unit 8 and the network monitoring unit 9 are in each case formed by a plurality of terminal monitoring units 8-1, 8-2, 8-3 and network monitoring units 9-1, 9-2, 9-3, respectively. The number of monitoring units actually provided in a network 1 is selected in accordance with the requirements.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for computer-assisted operation of an autonomous network comprising a plurality of autonomous terminals, each terminal having a programmable transceiver that is reconfigured to select different frequency ranges for communicating over a communication link, comprising:
    defining one or more technical system states of the network, each defined technical system state specifying a certain operation of the network;
    defining a set of rules for the autonomous terminals, the set of rules specifying authorized operating states and/or configurations of the autonomous terminals;
    executing by an analysis unit on the network:
        receiving data that relates to network resources being utilized from the autonomous terminals,
        monitoring actual operating states and/or configurations of the autonomous terminals, and
        determining how the actual operating states and/or configurations of the autonomous terminals affect an actual system state of the network including whether the actual system state of the network deviates from the one or more defined technical system states of the network; and
    modifying the set of rules specifying authorized operating states and/or configurations of the autonomous terminals when the actual system state of the network deviates from the one or more defined technical system states of the network.

2. The method as claimed in claim 1, further comprising: transmitting the set of rules to the autonomous terminals.

3. The method as claimed in claim 1, wherein the autonomous terminals assume a target operating state and/or a target configuration, which is derived from a context of utilization and utilization preferences, the target operating state and/or the target configuration fulfilling the set of rules.

4. The method as claimed in claim 1, wherein the set of rules cause the autonomous terminals to each report to the network, which network resources are utilized by the autonomous terminals.

5. The method as claimed in claim 4, wherein the network resources utilized comprise frequency range selected, transmission power selected, transmission codes used, and amount of interference encountered.

6. The method as claimed in claim 4, wherein the autonomous terminals each continuously report to the network which network resources are utilized.

7. The method as claimed in claim 1, wherein a network monitoring unit in the network monitors a network characteristic, and
    the analysis unit in the network further receives data relating to the network characteristic from the network monitoring unit in order to determine whether the actual system state of the network deviates from the one or more defined technical system states of the network.

8. The method as claimed in claim 7, wherein the network characteristic is monitored continuously.

9. The method as claimed in claim 1, wherein
    different sets of rules are defined for different sections of the network, and
    the different sets of rules take into consideration peculiarities of the different sections of the network such that the autonomous terminals operate differently in the different sections of the network.

10. The method as claimed in claim 9, wherein if a changing autonomous terminal changes from one section of the network to another section of the network, the changing autonomous terminal is assigned a previously presented set of rules.

11. The method as claimed in claim 1, wherein each section of the network has a network node with network-rule-providing functionality that maintains and makes available the set of rules for the relevant section of the network.

12. The method as claimed in claim 1, wherein
    a plurality of networks are administered separately from one another, but utilize common network resources, and
    the plurality of networks exchange their respective defined technical system states with one another.

13. The method as claimed in claim 1, wherein
    the set of rules comprises rules of a first type and rules of a second type,
    the rules of the first type relate to economic boundary conditions, and
    the rules of the second type relate to technical boundary conditions of the network.

14. The method as claimed in claim 1, wherein the autonomous terminals which do not adhere to the operating states and/or configurations specified by the rules are excluded from using the network.

15. The method as claimed in claim 1, wherein the network defines the set of rules.

16. The method as claimed in claim 1, wherein the network adapts the set of rules to conditions within network.

17. A network, comprising:
    a plurality of autonomous terminals each of which has a programmable transceiver to independently select and utilize a frequency range for communication over a communication link, the autonomous terminals being assigned at least one rule from a set of rules that set forth authorized operating states and/or configurations for the autonomous terminals;

an analysis unit that receives data relating to network resources being utilized by the autonomous terminals to monitor effects of actual operating states and/or configurations of the autonomous terminals on an actual system state of the network, and to determine whether the actual system state of the network deviates from one or more previously defined technical system states of the network that describe how the network should operate; and a rule generating unit to adapt the set of rules and/or define previously presented rules when the actual system state of the network deviates from the one or more previously defined technical system states of the network.

18. The network as claimed in claim 17, further comprising a network monitoring unit to monitor and/or determine a network characteristic.

19. The network as claimed in claim 17, further comprising a terminal monitoring unit to receive the data relating to network resources being utilized as transmitted by the autonomous terminals for the analysis unit.

20. The network as claimed in claim 19, wherein
the analysis unit further receives data relating to the network characteristic from the network monitoring unit, and
the analysis unit determines, from the received data for the network characteristic and the network resources, whether the actual system state of the network deviates from the one or more defined technical system states.

21. The network as claimed in claim 17, wherein the analysis unit produces an result output that is provided to the rule generating unit as input data for adapting the set of rules and/or defining previously presented rules.

22. An autonomous terminal capable of communicating on a network including capable of communicating with an analysis unit on the network, comprising:
a programmable transceiver to independently identify and use, by reconfiguring the programmable transceiver, different frequency ranges available for a communication link; and
a processor to:
process a set of rules provided by the network, each rule comprising authorized operating states and/or configurations of the autonomous terminal; and
assume a target operating state and/or a target configuration which fulfills/fulfill the set of rules and which is/are derived from a context of utilization and utilization preferences, based upon transmission, for the analysis unit on the network, of data that relates to network resources being utilized and in response to the analysis unit on the network monitoring of effects of actual operating states and/or configurations of autonomous terminals on an actual system state of the network including determination of whether the actual system state of the network deviates from one or more previously defined technical system states of the network that describe how the network should operate.

23. The terminal as claimed in claim 22, wherein the processor updates the set of rules at specified intervals.

24. A non-transitory computer readable storage medium storing a program to cause a computer to perform a method for an autonomous network comprising a plurality of autonomous terminals and an analysis unit on the autonomous network, each terminal having a programmable transceiver that is reconfigured to select different frequency ranges for communicating over a communication link, the method by the computer comprising:
defining one or more technical system states of the network, each defined technical system state specifying a certain operation of the network;
defining a set of rules for the autonomous terminals, the set of rules specifying authorized operating states and/or configurations of the autonomous terminals;
transmitting data relating to network resources being utilized by the autonomous terminals;
executing by the analysis unit on the network receiving of the data relating to network resources being utilized by the autonomous terminals, monitoring actual operating states and/or configurations of the autonomous terminals and determining how the actual operating states and/or configurations of the autonomous terminals affect an actual system state of the network including whether the actual system state of the network deviates from the one or more defined technical system states of the network; and
modifying the set of rules specifying authorized operating states and/or configurations of the autonomous terminals when the actual system state of the network deviates from the one or more defined technical system states of the network.

* * * * *

UNITED STATES PATENT AND TRADEMARK OFFICE
CERTIFICATE OF CORRECTION

Page 1 of 1

PATENT NO. : 8,619,625 B2
APPLICATION NO. : 12/225531
DATED : December 31, 2013
INVENTOR(S) : Käfer et al.

It is certified that error appears in the above-identified patent and that said Letters Patent is hereby corrected as shown below:

In the Specification
In Column 1, Line 11, Delete "Mar. 2, 2007," and insert -- Mar. 20, 2007, --, therefor.

In the Claims
In Column 10, Line 34, In Claim 10, delete "previously presented" and insert -- new --, therefor.
In Column 11, Line 10, In Claim 17, delete "previously presented" and insert -- new --, therefor.
In Column 11, Line 31, In Claim 21, delete "previously presented" and insert -- new --, therefor.

Signed and Sealed this
Twenty-sixth Day of August, 2014

Michelle K. Lee
*Deputy Director of the United States Patent and Trademark Office*